(No Model.)

C. H. WATEROUS.
CLUTCH PULLEY.

No. 499,618. Patented June 13, 1893.

Witnesses

Inventor
Charles H. Waterous,
By ........ Attorney

UNITED STATES PATENT OFFICE.

CHARLES H. WATEROUS, OF BRANTFORD, CANADA.

CLUTCH-PULLEY.

SPECIFICATION forming part of Letters Patent No. 499,618, dated June 13, 1893.

Application filed October 8, 1892. Serial No. 448,247. (No model.)

*To all whom it may concern:*

Be it known that I, CHARLES H. WATEROUS, of Brantford, in the county of Brant and Dominion of Canada, have invented certain new and useful Improvements in Clutch-Pulleys; and I do hereby declare the following to be a full, clear, and exact description of the invention, such as will enable others skilled in the art to which it appertains to make and use the same.

This invention contemplates certain new and useful improvements in clutch pulleys and it has for its object the production of simple and highly efficient means whereby the clutching and gripping of the shoes are greatly facilitated and the same will be made to bind firm and effect a thorough clutching of the parts.

A further object is to dispense with the necessity of employing wood friction blocks in the clutch-shoes.

The invention consists in providing the lever-arms with separable clutch shoes which will freely conform to the rim or flange of the second clutch part.

The invention further consists in providing the lever arms with pivoted clutch shoes having a limited free movement oblique to the line of revolution of the clutch parts whereby the gripping capacity is greatly increased.

The invention also comprises the detail construction, combination and arrangement of parts, substantially as hereinafter fully set forth and particularly pointed out in the claims.

Figure 1:
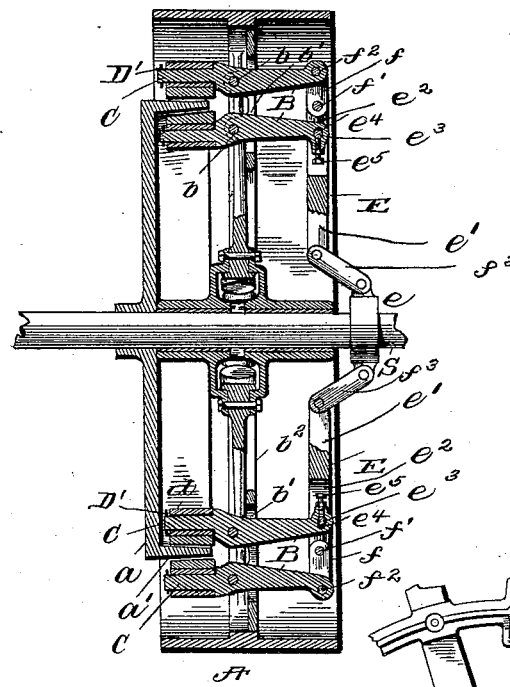
Figure 2:
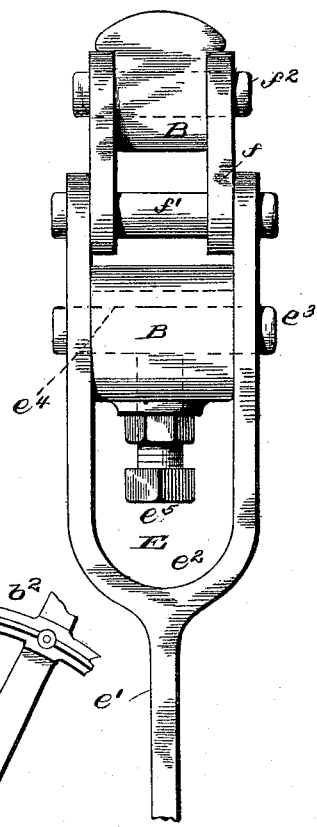
Figures 3, 5:
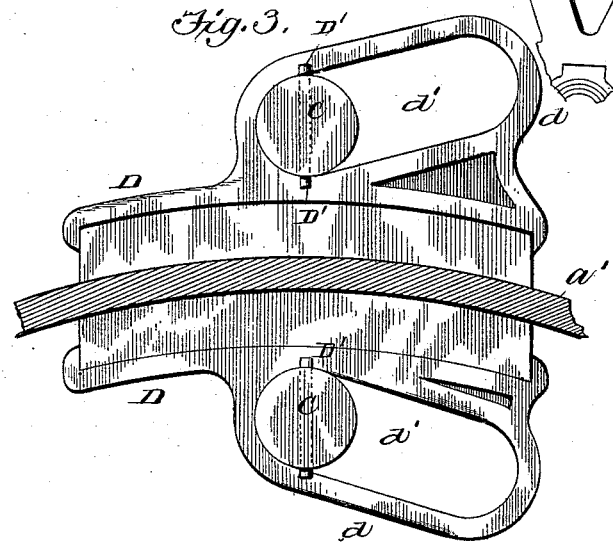
Figure 4:
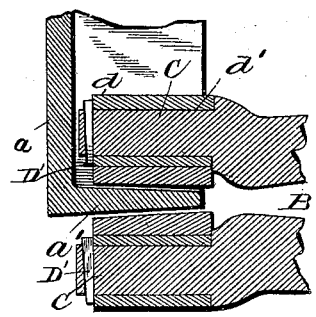

In the accompanying drawings:—Figure 1 is a vertical sectional view of a clutch pulley constructed in accordance with my invention. Fig. 2 is an inner end view of one pair of friction shoes. Fig. 3 is an outer end view of one pair of clutch arms. Fig. 4 is an enlarged detail view showing the tapered rim or flange of one of the clutch parts. Fig. 5 is a detail view with parts broken away.

Referring to the drawings, A designates one of the clutch parts, namely, the pulley, and $a$ the other clutch part, which is shown as consisting of a drive wheel having a rim or flange $a'$. The pulley is preferably loose on shaft S, while the drive-wheel $a$ is keyed thereon.

The rim or flange $a'$ is made tapering from its inner to its outer edge, as shown, thus providing inner and outer inclined contact surfaces of wedge-like form.

B, B, designate the lever-arms which are arranged in pairs, and each arm is pivoted by a pin $b$ extended through an opening therein and supported by the sides of a loop $b'$ of continuous ring or band $b^2$ attached to the spokes of the pulley. This ring or band is the same as that covered by my allowed application for patent filed October 2, 1891, Serial No. 407,547, and further description thereof will not here be given. Upon the inner ends of each lever arm is formed a stud C, and upon these studs are designed to be pivotally mounted the clutch shoes D. Each shoe has a widened portion $d$ in which is formed an inclined slot or opening $d'$ corresponding in width to the stud C upon which the shoe is slipped. Any suitable means may be employed for holding the shoes on the studs, such as an ordinary cotter-pin D'. By thus pivoting the shoes they are made to readily conform to the contact surface of the rim or flange of the drive-wheel and by reason of the inclined slot or opening in each shoe the latter will have a limited free movement toward each other and oblique to the line of revolution of the rotary drive-wheel and bind firm against the rim thereof in wedge-like manner. By thus pivotally mounting the shoes the latter may be composed entirely of metal, great accuracy in fitting up the parts not being necessary because of the shoes conforming themselves to the rim of the drive-wheel. Hence it is not necessary to employ wooden blocks as contact facings for the shoes, but the same may be used if desired. This arrangement also permits of the ready renewing of the friction surfaces without the necessity of removing any portion of the pulley from its position.

E is clutch operating mechanism which comprises a sleeve $e$ and radial arms $e'$ having each an outer U-shape or forked end $e^2$, the sides of which project over the outer end of the inner lever-arm and support a pin $e^3$ extended through a slot $e^4$ in such inner lever-arm. The position of this pin can be regulated by an adjusting screw $e^5$ working in an opening in the inner lever-arm. To the outer ends of the sides of the forked end $e^2$ are connected links $f$ by a cross-pin $f'$, and at their outer ends these links are held by a cross-pin $f^2$ extended through an opening in the end of the outer lever-arm. The inner ends of arms $e'$ are connected to sleeve $e$ by links $f^3$. By moving inward the sleeve $e$ the outer ends of the lever arms will be forced apart, closing the clutch shoes down upon the rim or flange, and by moving said sleeve outward said shoes will be released. By means of this construction the operation of the parts is rendered sure and positive and all wear or friction between the clutch operating mechanism and lever-arms is avoided.

The advantages of my invention are apparent to those skilled in the art to which it appertains. It will be specially observed that by making the shoes separable from the lever-arms I am enabled to employ shoes made entirely of metal, instead of wood and metal, and by providing the shoes with the inclined slots so that they will have a limited free movement oblique to the line of revolution of the clutch parts the shoes will be drawn tight against the rim or flange of the driver after the lever arms have been thrown into place and thus a firm wedge is secured. In addition to this wedge connection longitudinally of the shoes the latter are further bound or wedged in place laterally or transversely by reason of the taper of the rim or flange of the drive-wheel.

The improvements constitute a great advance in the art, and are simple and inexpensive and add greatly to the serviceability of the clutch.

While I have found it highly desirable to use a clutch shoe composed wholly of metal when the shoe can be readily replaced when worn without disturbing the other parts of the clutch, yet it is obvious that if desired shoes having wooden facings or friction blocks can be employed with like results.

I claim as my invention—

1. A clutch comprising two clutch parts, one fast, the other loose, and clutch shoes having a limited free movement oblique to the line of revolution of said clutch parts, substantially as set forth.

2. A clutch, comprising two clutch parts, one fast, and the other loose, lever-arms, and separable shoes connected thereto and having a free movement oblique to the line of revolution of said clutch parts, substantially as set forth.

3. A clutch, comprising two clutch parts, one fast, the other loose, lever arms having studs projecting therefrom, and the shoes having inclined slots in which said studs fit, substantially as set forth.

4. A clutch, comprising two clutch parts, one fast the other loose, one of said clutch parts having a rim or flange tapering from its inner to its outer edges, and the other clutch part carrying clutch shoes designed to bind on each side of said rim or flange, substantially as set forth.

5. A clutch, comprising two clutch parts, one fast having a tapering rim or flange, and the other loose carrying clutch-shoes corresponding on their contact faces with said rim or flange and having a limited free movement oblique to the line of revolution of said clutch parts and designed to engage said tapered rim or flange, substantially as set forth.

6. A clutch comprising two clutch parts, one fast having a tapered rim or flange, and the other loose carrying lever-arms having studs projecting therefrom, and the shoes mounted on said studs and having inclined slots therefor, the contact faces of said shoes corresponding with said rim or flange, substantially as and for the purpose stated.

7. A clutch comprising two clutch parts, one fast, the other loose, the lever-arms carried by one of said clutch parts, and the clutch operating mechanism having lateral arms connected to the outer ends of both of said lever-arms, and an adjusting screw, substantially as set forth.

8. The clutch comprising two clutch parts, one fast, the other loose, the lever arms carried by one of said clutch parts, and the clutch operating mechanism having lateral arms provided each with an outer forked or U-shaped end, the bolt or pin pivoting the same to the inner one of said lever-arms, and the links pivotally connected to said U-shaped end and also to the outer one of said lever arms, substantially as set forth.

9. The combination with a clutch having lever arms, arranged in pairs, the inner one of each pair having a slot and an adjusting screw, of clutch operating mechanism comprising a sleeve, lateral arms, cross-pins therefor extended through said slots and against which said adjusting screw bears, the links connecting the outer lever arms and the lateral arms and the links $f^3$, substantially as set forth.

In testimony whereof I have signed this specification in the presence of two subscribing witnesses.

CHARLES H. WATEROUS.

Witnesses:
WM. S. HODGES.
J. W. MCGILL.